United States Patent
Azuma et al.

(10) Patent No.: US 9,238,446 B2
(45) Date of Patent: Jan. 19, 2016

(54) SIDE AIRBAG DEVICE

(71) Applicant: ASHIMORI INDUSTRY CO., LTD., Osaka-shi, Osaka (JP)

(72) Inventors: Hidetaka Azuma, Settsu (JP); Katsunori Imai, Settsu (JP); Kou Sasaki, Settsu (JP); Yoshitaka Okagami, Settsu (JP); Miwa Matsuoka, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 36 days.

(21) Appl. No.: 14/353,080

(22) PCT Filed: Oct. 22, 2012

(86) PCT No.: PCT/JP2012/077270
§ 371 (c)(1),
(2) Date: Apr. 21, 2014

(87) PCT Pub. No.: WO2013/061935
PCT Pub. Date: May 2, 2013

(65) Prior Publication Data
US 2014/0300089 A1    Oct. 9, 2014

(30) Foreign Application Priority Data

Oct. 26, 2011  (JP) ................................ 2011-234770

(51) Int. Cl.
*B60R 21/237* (2006.01)
*B60R 21/231* (2011.01)

(52) U.S. Cl.
CPC ......... *B60R 21/237* (2013.01); *B60R 21/23138* (2013.01); *B60R 2021/23146* (2013.01)

(58) Field of Classification Search
CPC .................. B60R 2021/23146; B60R 21/237; B60R 21/32138

USPC ...................................................... 280/730.2
See application file for complete search history.

(56) References Cited

U.S. PATENT DOCUMENTS 5,992,882 A * 11/1999 Ito et al. ...................... 280/743.1
6,142,507 A   11/2000 Okuda et al.
(Continued)

FOREIGN PATENT DOCUMENTS

| JP | 10-181498 A  | 7/1998 |
| JP | 2000-95049 A | 4/2000 |

(Continued)

OTHER PUBLICATIONS

International Search Report for PCT/JP2012/077270 dated Dec. 18, 2012.

*Primary Examiner* — Paul N Dickson
*Assistant Examiner* — Joselynn Y Sliteris
(74) *Attorney, Agent, or Firm* — Sughrue Mion, PLLC (57) ABSTRACT

A side airbag device (1) protects the passenger (90) in the lateral space (92). The airbag (10) has an attaching portion (11) attached to a side section (85) of a seat (80), and is folded so as to be able to deploy from the side section (85) toward the lateral space (92). The inflator (2) generates gas and thereby deploys the airbag (10) to a leading end portion (12) in the deployment direction (F). The airbag (10) has a bellows-like folded section in which a part (30) between the leading end portion (12) and the attaching portion (11) is folded in a bellows-like shape. The bellows-like folded section is disposed in front of the attaching portion (11) in the deployment direction (F), and is folded double toward the back of the deployment direction (F) so that a portion (32) close to the attaching portion (11) is positioned therein.

12 Claims, 8 Drawing Sheets

(56) References Cited

U.S. PATENT DOCUMENTS

| | | | |
|---|---|---|---|
| 6,142,517 A * | 11/2000 | Nakamura et al. | 280/739 |
| 6,612,610 B1 | 9/2003 | Aoki et al. | |
| 7,322,600 B2 * | 1/2008 | Inoue | B60R 21/232 280/730.2 |
| 8,308,192 B2 * | 11/2012 | Konishi | B60R 21/213 280/730.2 |
| 2010/0295277 A1 | 11/2010 | Ochiai et al. | |
| 2013/0087999 A1 * | 4/2013 | Konishi | B60R 21/201 280/743.1 |

FOREIGN PATENT DOCUMENTS

| | | | | |
|---|---|---|---|---|
| JP | 2010-70178 A | | 4/2010 | |
| JP | DE 10248532 B4 * | | 8/2010 | B60R 21/237 |
| JP | 2011-1051 A | | 1/2011 | |

* cited by examiner

SIDE AIRBAG DEVICE

CROSS REFERENCE TO RELATED APPLICATIONS

This application is a National Stage of International Application No. PCT/JP2012/077270 filed Oct. 22, 2012, claiming priority based on Japanese Patent Application No. 2011-234770 filed Oct. 26, 2011, the contents of all of which are incorporated herein by reference in their entirety.

TECHNICAL FIELD

The present invention relates to a side airbag device that is mounted on a seat for a vehicle to protect a passenger by an airbag.

BACKGROUND ART

In order to protect the passenger in the case where the vehicle is under emergency or comes into collision, the side airbag device including an airbag has been used. The side airbag device is mounted on a side section of the seat. The airbag inflates and deploys in a narrow space between the passenger and a sidewall (e.g., a door trim) of the vehicle, to thereby receive the passenger. Therefore, when the deployment speed of the airbag is slow, the door trim might hit the passenger. Furthermore, by contact of the airbag in the process of deployment with the passenger, accurate deployment of the airbag might be prevented.

The contact of the airbag with the passenger can be suppressed by deploying the airbag to the sidewall. However, in this case, the airbag is rubbed against the sidewall, thus deployment of the airbag might be slower. Furthermore, the airbag might also fail to deploy accurately. Therefore, from the viewpoint of secure protection of the passenger, the side airbag device is required to be accurately and quickly deployed. In contrast to this, there is conventionally known a side airbag device in which a part of the airbag is obliquely folded back to thereby speed up deployment of the airbag (see Patent Literature 1).

However, in such a conventional side airbag device, the airbag is continuously folded in half in the same direction, or alternately folded to thereby be folded in a bellows-like shape. Since such a folded airbag is unfolded swiftly, the airbag deploys quickly. However, since it is hard to regulate the deployment direction of the airbag, the deployment direction of the airbag might vary. Furthermore, some conventional side airbag devices have an airbag wound up in a roll-like shape in the same direction, and with such an airbag wound up in a roll-like shape, the deployment direction of the airbag can be regulated. However, it takes a long time to unwind the roll, and thus the deployment speed of the airbag might be slower. Therefore, it is difficult to achieve accurate and quick deployment of the airbag by using the conventional side airbag devices.

CITATION LIST

Patent Literature

PTL 1: Japanese Patent Laid-Open No. 2010-70178

SUMMARY OF INVENTION

Technical Problem

The present invention has been made in view of the conventional problem, and an object thereof is to accurately and quickly deploy the airbag which the side airbag device includes, toward a lateral space between the passenger and the vehicle sidewall.

Solution to Problem

The present invention is a side airbag device mounted on a side section of a seat for a vehicle to protect a passenger in a lateral space between the passenger sitting on the seat and a sidewall of the vehicle, including: an airbag having an attaching portion attached to the side section of the seat, and being folded up so as to be able to deploy from the side section of the seat toward the lateral space; and an inflator which generates gas for inflating and deploying the airbag from the attaching portion to a leading end portion thereof in a deployment direction, wherein the airbag has a bellows-like folded section in which a part between the leading end portion and the attaching portion is folded in a bellows-like shape; and wherein the bellows-like folded section is disposed in front of the attaching portion in the deployment direction, and is folded double toward the back of the deployment direction so that a portion close to the attaching portion is positioned therein.

Furthermore, the present invention is a side airbag device mounted on a side section of a seat for a vehicle to protect a passenger in a lateral space between the passenger sitting on the seat and a sidewall of the vehicle, including: an airbag having an attaching portion attached to the side section of the seat, and being folded up so as to be able to deploy from the side section of the seat toward the lateral space; and an inflator which generates gas for inflating and deploying the airbag from the attaching portion to a leading end portion thereof in a deployment direction, wherein the airbag has a roll-like folded section in which a part between the leading end portion and the attaching portion is folded in a roll-like shape; and wherein the roll-like folded section is disposed in front of the attaching portion in the deployment direction, and is folded double toward the back of the deployment direction so that a portion close to the attaching portion is positioned therein.

Moreover, the present invention is a side airbag device mounted on a side section of a seat for a vehicle to protect a passenger in a lateral space between the passenger sitting on the seat and a sidewall of the vehicle, including: an airbag having an attaching portion attached to the side section of the seat, and being folded up so as to be able to deploy from the side section of the seat toward the lateral space; and an inflator which generates gas for inflating and deploying the airbag from the attaching portion to a leading end portion thereof in a deployment direction, wherein the airbag has a roll-like folded section in which a part on the leading end portion side is folded in a roll-like shape, and a bellows-like folded section in which a part on the attaching portion side is folded in a bellows-like shape, overlapping with the roll-like folded section; and wherein the roll-like folded section and the bellows-like folded section are disposed in front of the attaching portion in the deployment direction, and are folded double toward the back of the deployment direction so that a portion close to the attaching portion is positioned therein.

Advantageous Effects of Invention

According to the present invention, it is possible to accurately and quickly deploy an airbag provided in a side airbag device, toward a lateral space between a passenger and a vehicle sidewall.

DESCRIPTION OF EMBODIMENTS

Hereinafter, there will be described an embodiment of a side airbag device according to the present invention with reference to the accompanying drawings.

The side airbag device according to the present embodiment is mounted in a vehicle and deploys an airbag in the lateral of a passenger to thereby receive and protect the passenger by the inflating and deploying airbag.

Figure 1:
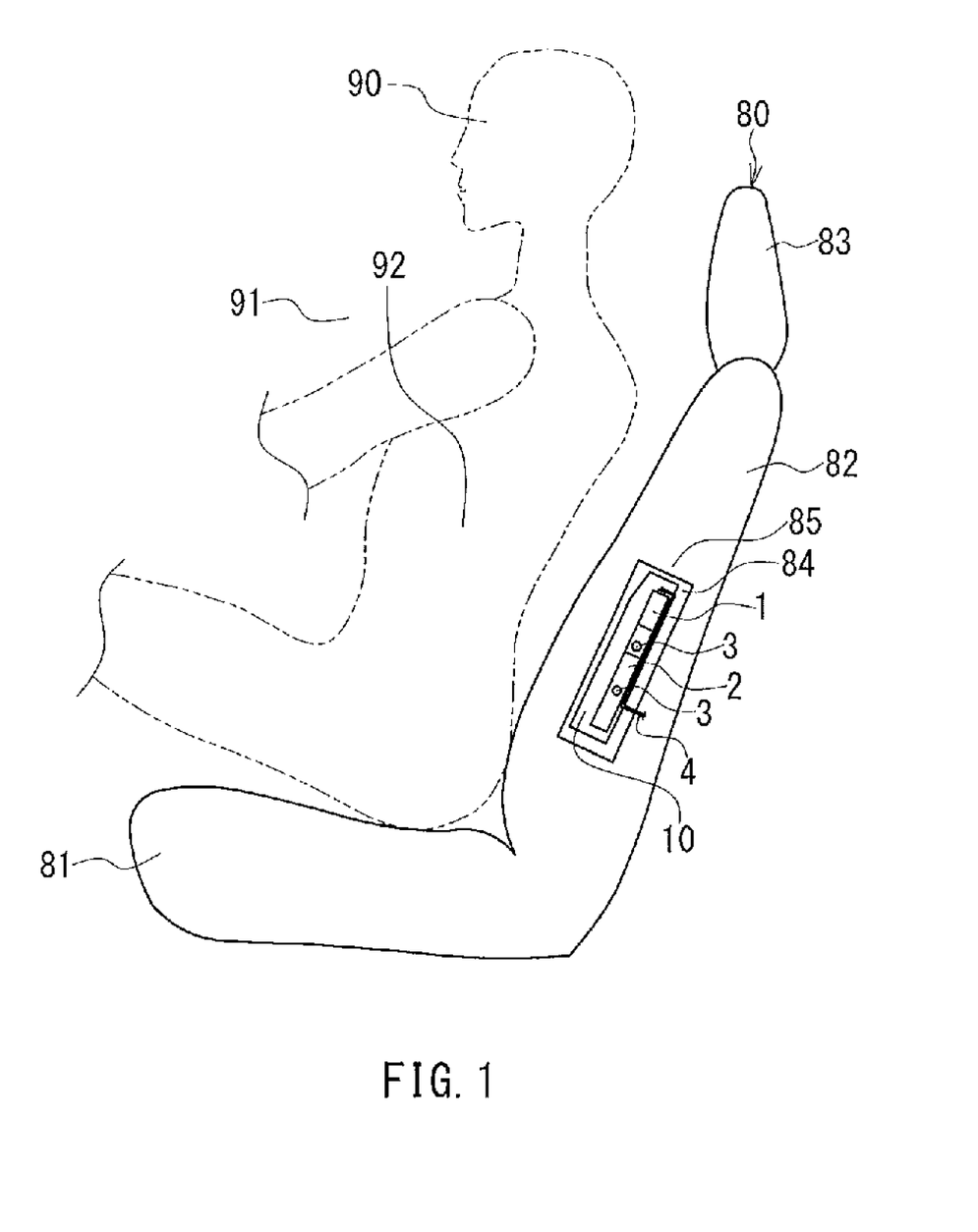
FIG. 1 is a side view of a seat that mounts a side airbag device according to the present embodiment.

FIG. 1 is a side view of a seat that mounts the side airbag device according to the present embodiment, viewed from the inside of the vehicle, and the side airbag device 1 is shown while being seen through the seat 80.

Meanwhile, in FIG. 1, a sidewall 91 of the vehicle is positioned on the back side of the seat 80 and the passenger 90 (the back side of the page), and includes, for example, a door trim and a window. In FIG. 1, the left-hand side is a front side in the vehicle, and the right-hand side is a rear side in the vehicle. Herein, a front side, a rear side, an upper side, and a lower side in the vehicle are respectively referred to as a vehicle front side, a vehicle rear side, a vehicle upper side, and a vehicle lower side. In addition, a front-rear direction and a top-bottom direction in the vehicle are respectively referred to as a vehicle front-rear direction and a vehicle top-bottom direction. A width direction in the vehicle is referred to as a vehicle width direction.

The seat 80 is a seat for the vehicle, and has a seat cushion 81 for the passenger 90 to sit on, and a seat back 82 and a headrest 83 positioned on the back face of the passenger 90, as shown in the figure. Furthermore, the seat 80 has a housing portion 84 for housing the side airbag device 1, within the seat back 82. The housing portion 84 is positioned on the outer side in the vehicle width direction within the seat back 82 (the back side of the page in FIG. 1), and is provided in a side section 85 of the seat 80 (seat back 82). The side airbag device 1 is attached to the seat 80 (for example, to a seat frame) within the housing portion 84.

The side airbag device 1 is mounted on the side section 85 of the seat 80, and includes a bag-like airbag (side airbag) 10, a cylindrical inflator 2, and attaching members 3. The airbag 10 is folded so as to be able to inflate and deploy and housed in the housing portion 84, and is attached to the side section 85 of the seat 80 by the attaching members 3 provided in the inflator 2. The attaching members 3 include bolts attached to the inflator 2.

The side airbag device 1 protects the passenger 90 by the airbag 10 in a lateral space 92 which is a space between the passenger 90 sitting on the seat 80 and the sidewall 91 of the vehicle. The airbag 10 is folded so as to be able to deploy from the side section 85 of the seat 80 toward the lateral space 92, and is disposed in the side section 85 of the seat 80 in a folded state.

The inflator 2 is a cylinder-type gas-generating device, and is disposed within the airbag 10. The inflator 2 is housed in the housing portion 84 along with the airbag 10, and is attached to the side section 85 of the seat 80 by the attaching members 3. The inflator 2 is connected to a control device (not shown) of the vehicle via a harness 4. When the vehicle is under emergency or detects a shock, the inflator 2 generates a gas from a plurality of jetting ports to inflate and deploy the airbag 10 on receipt of an actuating signal via the harness 4. The inflator 2 generates the gas within the airbag 10 and supplies the gas to the folded airbag 10. The airbag 10 attached to the side section 85 of the seat 80 is inflated and deployed along the sidewall 91 by the gas.

Figure 2:
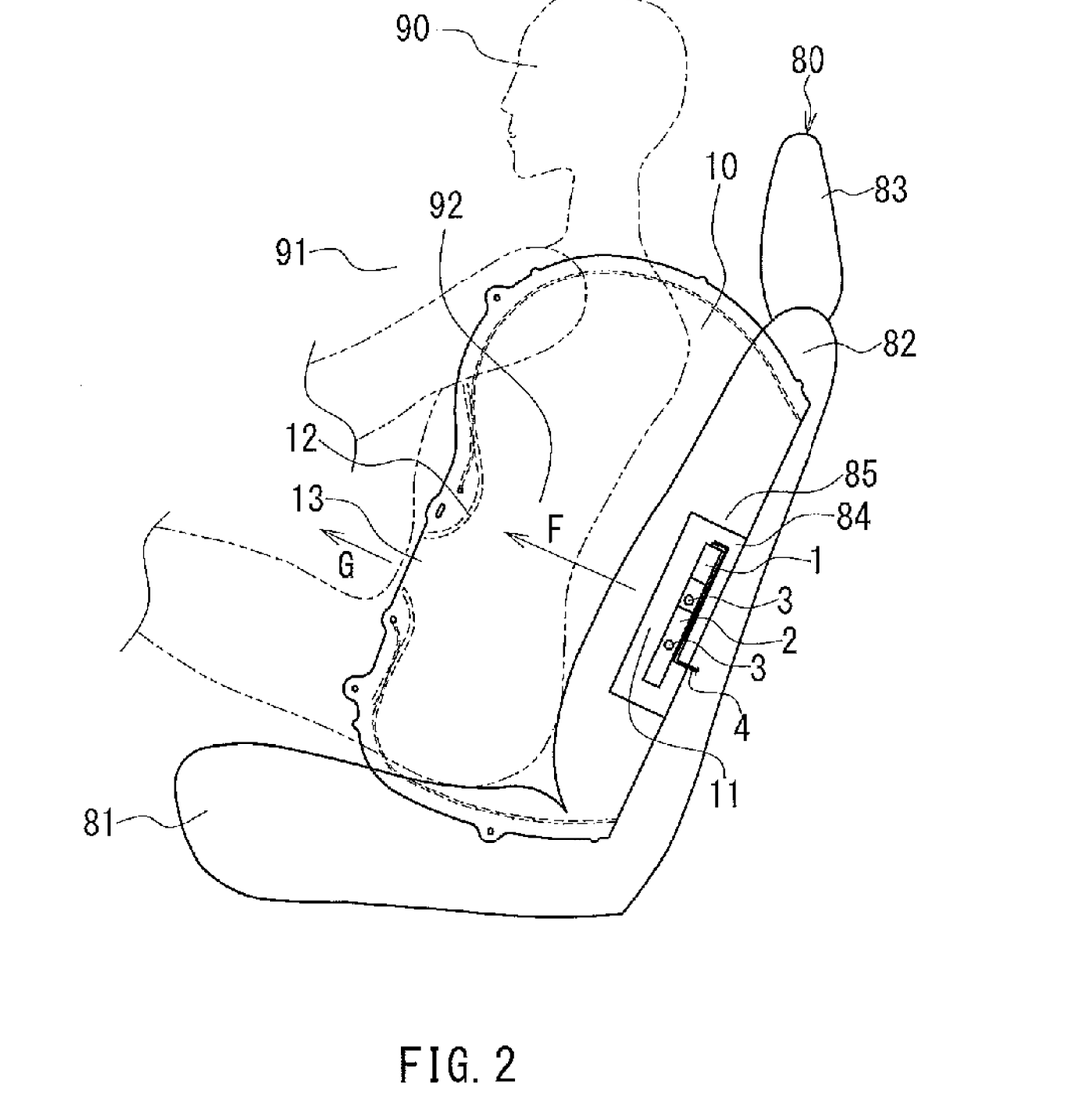
FIG. 2 is a side view of an inflated and deployed airbag.
Figure 3A:
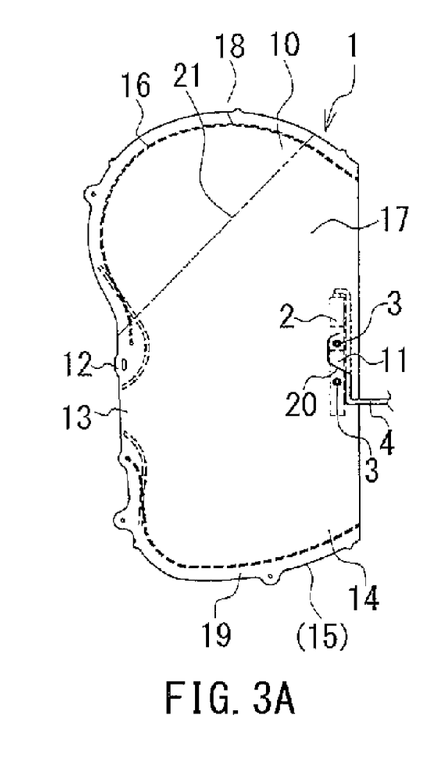
FIGS. 3A to 3C are views showing a folding procedure of the airbag.
Figure 3B:
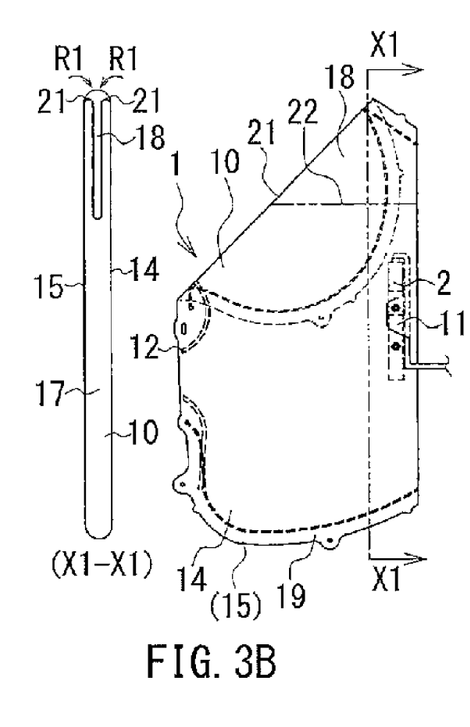
Figure 3C:
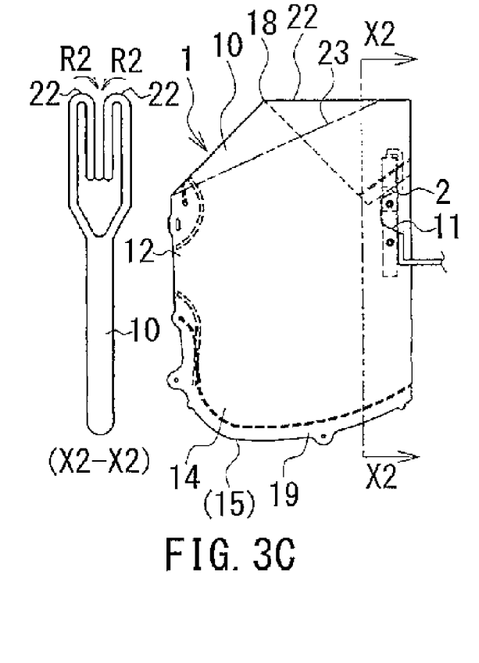
Figure 4A:
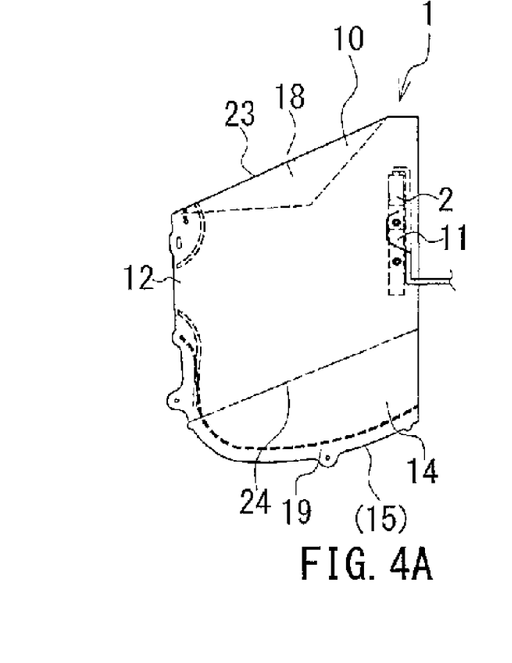
FIGS. 4A to 4C are views showing a folding procedure of the airbag.
Figure 4B:
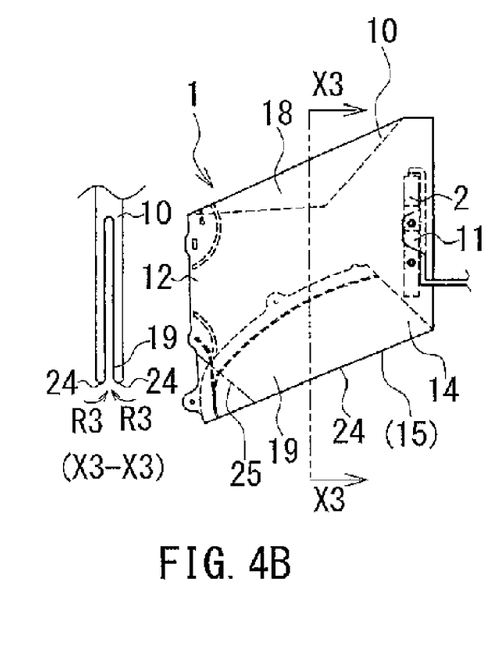
Figure 4C:
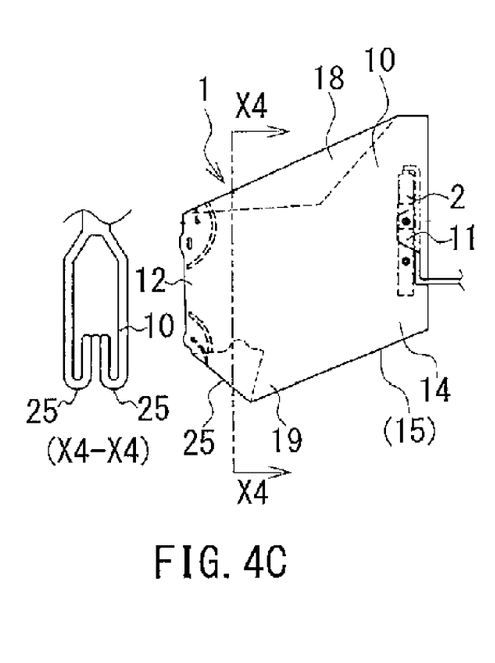

FIG. 2 is a side view of the inflated and deployed airbag 10, showing the side airbag device 1, the seat 80, and the passenger 90 in association with FIG. 1.

As shown by the FIG. 2, the airbag 10 has an attaching portion 11 which is attached to the side section 85 of the seat 80. The attaching portion 11 is a base end portion of the airbag 10 (an end portion on the vehicle rear side) in which the inflator 2 is disposed, and is attached to the side section 85 of the seat 80 by the attaching members 3.

The inflator 2 is contained in the attaching portion 11 of the airbag 10 and attached to the seat 80, and deploys the airbag 10 by the gas from the attaching portion 11 to a leading end portion 12 in a deployment direction F. The deployment direction F is a direction of deployment of the airbag 10 when the airbag 10 deploys from the side section 85 of the seat 80 toward the lateral space 92. Since the airbag 10 deploys from the side section 85 to the vehicle front side, the leading end portion 12 of the airbag 10 is an end portion of the airbag 10 on the vehicle front side. The airbag 10 deploys to the vehicle front side of the attaching portion 11 while inflating by the gas, and projects from the side section 85 of the seat 80 to the outside of the seat back 82 (within the vehicle interior), and thereby inflate and deploy in the lateral space 92.

During inflation and deployment of the airbag 10, the attaching portion 11 of the airbag 10 is held in the side section 85 by the attaching members 3. The airbag 10 is formed so as to have a size and shape according to part of the passenger 90 to be protected, and deploys to the vehicle front side of the seat back 82 and deploys to the vehicle upper side of the seat cushion 81. This airbag 10 has a larger size in the vehicle top-bottom direction than that in the vehicle front-rear direction, and is formed so that the upper portion inflates more greatly than the lower portion. The airbag 10 deploys in the vehicle top-bottom direction while deploying in the deployment direction F. As a result, the entire airbag 10 inflates and deploys between the passenger 90 and the sidewall 91. The passenger 90 is received and protected by the airbag 10.

The airbag 10 has a vent hole 13 provided in the leading end portion 12. The gas within the airbag 10 is discharged from the vent hole 13 to the outside of the airbag 10, that is, from the side of the passenger 90 to the vehicle front side (an arrow G in FIG. 2) when the airbag 10 receives the passenger 90. This absorbs and cushions impact of the passenger 90.

Next, there will be described a procedure of manufacturing the side airbag device 1 and a folding procedure of the airbag 10.

FIGS. 3A to 3C, FIGS. 4A to 4C and FIGS. 5A to 5F are views showing procedures of folding the airbag 10. FIGS. 3A to 3C, FIGS. 4A to 4C and FIGS. 5A to 5F are side views of the side airbag device 1 corresponding to FIG. 2. In addition, FIGS. 3B, 3C and FIGS. 4B, 4C are cross-sectional views showing the airbag 10 cut along a line in the top-bottom direction. FIGS. 5A to 5E (excluding FIG. 5F) are cross-sectional views showing the side airbag device 1 cut along a line in the front-rear direction.

The airbag 10 (see FIG. 3A) has a front base cloth (front panel) 14 on the passenger 90 side, and a back base cloth (back panel) 15 on the sidewall 91 side. The base cloths 14 and 15 are formed into the same shape by cloths (for example, cloths coated with a resin), and connect with each other in the attaching portion 11 of the airbag 10. The base cloths 14 and 15 are folded back along the boundary therebetween. Next, the overlapped base cloths 14 and 15 are joined with each other in an airtight manner in the outer edge joint portion 16. The base cloths 14 and 15 are joined in the outer edge joint portion 16 by sewing (or by sewing and bonding). The outer edge joint portion 16 closes outer edge portions of the base cloths 14 and 15, and thereby forms an air chamber 17 between the base cloths 14 and 15. The air chamber 17 is inflated by the gas the inflator 2 generates.

The vent hole 13 includes a non-joined portion formed in the outer edge portion of the airbag 10. The vent hole 13 is formed in the airbag 10 without joining a part of the airbag 10 with the outer edge joint portion 16. The inflator 2 is inserted into the airbag 10 through a slit 20 formed in the attaching portion 11 of the airbag 10. The harness 4 is disposed outside the airbag 10 through the slit 20. When the inflator 2 is attached to the side section 85 of the seat 80, the inflator 2 and a member of the side section 85 sandwich the slit 20 therebetween to close it.

When folding the airbag 10, the inflator 2 is disposed within the attaching portion 11 of the airbag 10. The airbag 10 is laid flat on a working bench. Next, an upper end portion 18 of the airbag 10 is tucked into the airbag 10, that is, pushed into the airbag 10 so as to turn inside out and folded along a first fold line 21 (see FIG. 3B). In this way, the upper end portion 18 of the airbag 10 is folded inside the airbag 10. Subsequently, the upper end portion 18 of the airbag 10 is folded inside the airbag 10 along a second fold line 22 (an arrow R1 in FIG. 3B) (see FIG. 3C). After that, the upper end portion 18 of the airbag 10 is folded inside the airbag 10 along a third fold line 23 (an arrow R2 in FIG. 3C) (see FIG. 4A).

The upper end portion 18 of the airbag 10 is folded compactly by sequentially folding the upper end portion 18 of the airbag 10 inside the airbag 10 along the three fold lines 21 to 23. A lower end portion 19 of the airbag 10 is folded inside the airbag 10 along a fourth fold line 24 (see FIG. 4B). Next, the lower end portion 19 of the airbag 10 is folded inside the airbag 10 along a fifth fold line 25 (an arrow R3 in FIG. 4B) (see FIG. 4C). The airbag 10 is folded so as to fit the size of the attaching portion 11 by folding both the end portions 18 and 19 of the airbag 10.

Subsequently, a part 30 between the leading end portion 12 and the attaching portion 11 of the airbag 10 (see FIGS. 5A to 5F) is folded so as to be able to deploy in the deployment direction F. Here, the airbag 10 is folded like a bellows by folding it in a bellows-like shape. The airbag 10 is sequentially folded back in the reverse direction along a plurality of fold lines 26 to 28 intersecting with the deployment direction F. In this way, the airbag 10 is folded in a bellows-like shape by folding it to form a bellows-like shape. At this time, the airbag 10 is folded like a bellows on one surface side of the airbag 10. Hereafter, a detailed description will be given of the bellows-like folding of the airbag 10.

The airbag 10 is folded in a bellows-like shape on the inner side in the vehicle width direction. At this time, at first, the airbag 10 (see FIG. 5A) is folded along a sixth fold line 26 (an arrow R4 in FIG. 5A). The sixth fold line 26, at a position adjacent to the attaching portion 11 of the airbag 10, is set obliquely to the vehicle top-bottom direction. The leading end portion 12 of the airbag 10 is moved toward the back of the deployment direction F. In this way, the airbag 10 is folded back obliquely upward along the sixth fold line 26 (see FIG. 5B). Next, the leading end portion 12 of the airbag 10 is moved toward the front of the deployment direction F (an arrow R5 in FIG. 5B). The airbag 10 is folded back along a seventh fold line 27 (see FIG. 5O). Furthermore, the leading end portion 12 of the airbag 10 is moved toward the back of the deployment direction F (an arrow R6 in FIG. 5C), and thus the airbag 10 is folded back along an eighth fold line 28 (see FIG. 5D).

The airbag 10 is folded back along the three fold lines 26 to 28 toward the inner side in the vehicle width direction, and thus a bellows-like folded section 31 in the airbag 10 is formed. That is, the airbag 10 has a bellows-like folded section 31 in which the part 30 between the leading end portion 12 and the attaching portion 11 is folded in a bellows-like shape with a predetermined width. The bellows-like folded section 31 is disposed in front of the attaching portion 11 in the deployment direction F, adjacent to the attaching portion 11. The folded-back airbag 10 forms a overlap in the bellows-like folded section 31.

Figure 5A:
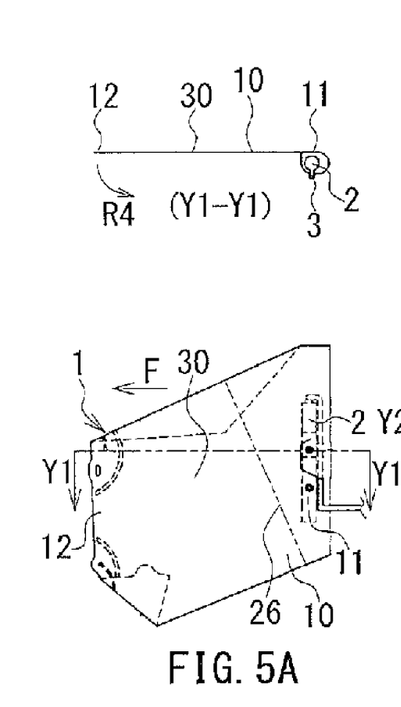
FIGS. 5A to 5F are views showing a folding procedure of the airbag.
Figure 5B:
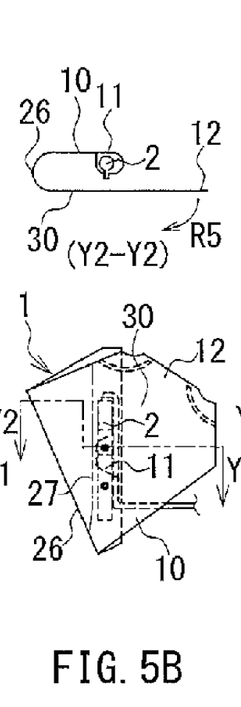
Figure 5C:
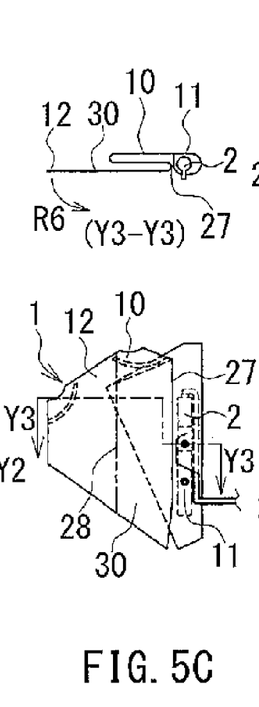
Figure 5D:
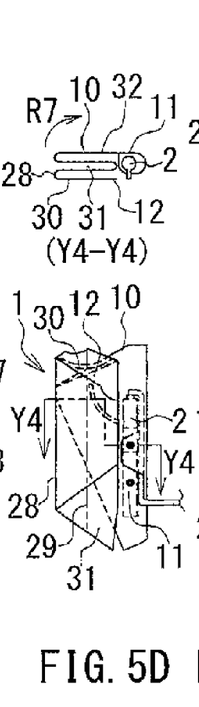
Figure 5E:
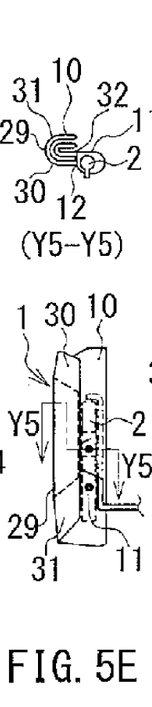
Figure 5F:
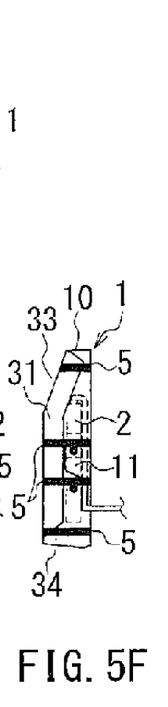

Subsequently, the bellows-like folded section 31 is folded along a ninth fold line 29 toward the outer side in the vehicle width direction (an arrow R7 in FIG. 5D). The ninth fold line 29 is a center line of the bellows-like folded section 31 in the width direction. The bellows-like folded section 31 is folded in half along the ninth fold line 29 toward the opposite side of the bellows-like folded section 31. The opposite side of the bellows-like folded section 31 means a side opposite to the side in which the bellows-like folded section 31 of the airbag 10 is formed. The bellows-like folded section 31 is folded double toward the back of the deployment direction F so that a portion 32 close to the attaching portion 11 is positioned therein (see FIG. 5E). The portion 32 of the airbag 10 close to the attaching portion 11 is a part where the gas is initially supplied from the inflator 2 in the attaching portion 11. This portion 32 is an end portion of the bellows-like folded section 31 close to the attaching portion 11, and is sandwiched in the double-folded bellows-like folded section 31.

The bellows-like folded section 31 is folded back like a bellows along a plurality of fold lines 26 to 29 intersecting with the deployment direction F and then folded in half. The folded bellows-like folded section 31 is disposed in front of the attaching portion 11 in the deployment direction F, and after that, breakable adhesive tapes 5 are wound around a plurality of areas in the airbag 10 (see FIG. 5F). The airbag 10 is held in a state of being folded by the tape 5 which is broken at the time of deployment of the airbag 10. Since the upper end portion 18 of the airbag 10 is folded inside the airbag 10, the upper portion 33 of the folded airbag 10 becomes smaller. In addition, the lower end portion 19 of the airbag 10 is folded inside the airbag 10, and the airbag 10 is folded back obliquely upward along the sixth fold line 26. As a result, the lower portion 34 of the folded airbag 10 becomes smaller.

The side airbag device 1 is manufactured through the above process. The side airbag device 1 is housed in the housing portion 84 of the seat 80 (see FIG. 1), and is attached in the side section 85 of the seat 80. When the inflator 2 is actuated, the airbag 10 inflates and deploys by the gas supplied from the inflator 2, as described above (see FIG. 2). That is, the airbag 10 deploys from the side section 85 of the seat 80 toward the lateral space 92.

FIGS. 6A to 6D are views showing a deployment process of the airbag 10, and are cross-sectional views of the side airbag device 1 corresponding to FIG. 5A to FIG. 5E. The side airbag device 1 is shown in cut-away views along a line in the front/rear direction.

When the airbag 10 is deployed, the gas is initially supplied to the interior portion 32 of the double-folded bellows-like folded section 31 (see FIG. 6A and FIG. 6B), and thus the bellows-like folded section 31 starts to inflate from the interior.

Figure 6A:
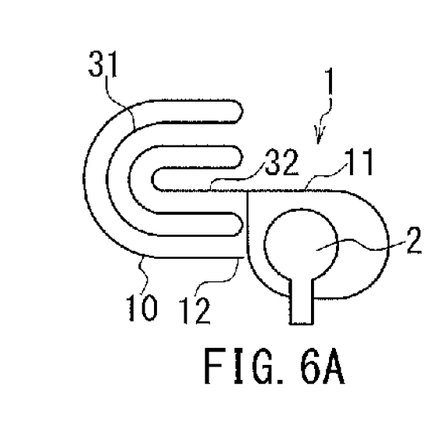
FIGS. 6A to 6D are views showing a deployment process of the airbag.
Figure 6B:
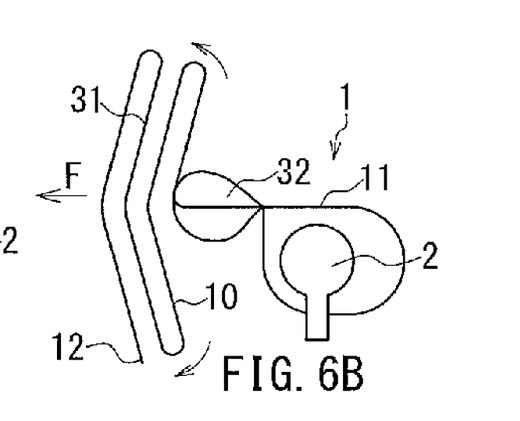

The double-folded bellows-like folded section 31 deploys in such a manner that it is pushed out in the deployment direction F by the gas, and projects from the side section 85 of the seat 80 toward the deployment direction F (the vehicle front side). At this time, the direction in which the bellows-like folded section 31 deploys is regulated because of the double folding, and thus variation in the deployment direction F is suppressed and the bellows-like folded section 31 stably deploys at a fast speed in the predetermined deployment direction F. During the early stage of deployment of the airbag 10, the double-folded bellows-like folded section 31 accurately deploys toward the lateral space 92 while unfolding, and the bellows-like folded section 31 promptly projects in the deployment direction F.

Figure 6C:
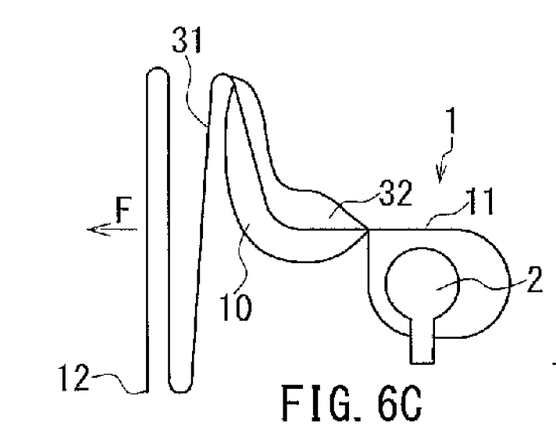
Figure 6D:
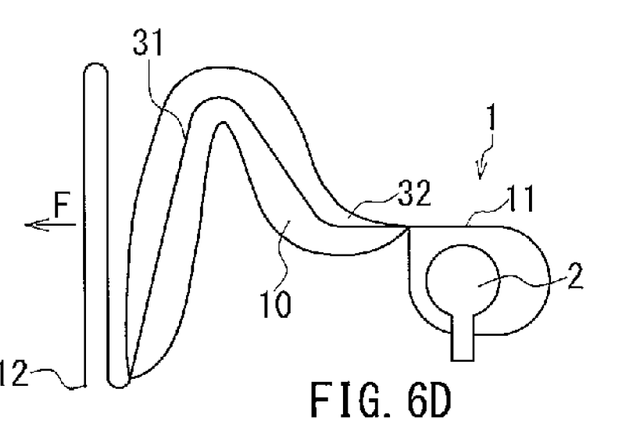

Subsequently, the bellows-like folded section 31 is deployed from the attaching portion 11 toward the leading end portion 12 by the gas (see FIG. 6C). The bellows-like folded section 31, having been unfolded from the double-folded condition, is put into an overlapping state toward the deployment direction F, and under this state, the bellows-like folded section 31 sequentially inflates toward the deployment direction F (see FIG. 6D). The bellows-like folded section 31 is pushed out like a spring in the deployment direction F, in association with the inflation. As a result, deployment of the bellows-like folded section 31 is sped up, and also, the direction in which the bellows-like folded section 31 deploys is stabilized. The bellows-like folded section 31 accurately and rapidly deploys to the lateral space 92. Furthermore, in the present embodiment, since the upper end portion 18 and the lower end portion 19 of the airbag 10 are folded inside the airbag 10, the gas supplied to the airbag 10 flows preferentially toward the deployment direction F within the airbag 10. The bellows-like folded section 31 deploys more quickly by the gas flow in the deployment direction F.

In association with the deployment of the bellows-like folded section 31, the upper end portion 18 of the airbag 10 deploys to the vehicle upper side. Since the upper end portion 18 has been folded inside the airbag 10, resistance acting on the upper end portion 18 during deployment of the upper end portion 18 becomes smaller. The upper end portion 18 deploys reliably at a fast speed, and the lower end portion 19 of the airbag 10 deploys to the vehicle lower side similarly to the upper end portion 18. The airbag 10 deploys in the vehicle top-bottom direction while being unfolded from the bellows-like folded condition, so that it inflates and deploys between the passenger 90 and the sidewall 91.

As described above, according to the side airbag device 1 of the present embodiment, it is possible to accurately and quickly deploy the airbag 10 toward the lateral space 92. It is also possible to suppress contact of the airbag 10 with the passenger 90 or the sidewall 91. Furthermore, it is possible to reliably inflate and deploy the airbag 10 into the lateral space 92. It is possible to deploy the bellows-like folded section 31 more accurately in the deployment direction F by folding the bellows-like folded section 31 along the fold lines 26 to 29 intersecting with the deployment direction F.

Meanwhile, when forming the bellows-like folded section 31, the airbag 10 may be folded in a bellows-like shape by ways of folding other than that described above. That is, the airbag 10 just has to be folded in a bellows-like shape so as to be able to deploy in the deployment direction F. The bellows-like folded section 31 may also be formed by folding back the airbag 10 twice, or four times or more. The airbag 10 may also be folded in a bellows-like shape on the outer side in the vehicle width direction. In this case, the bellows-like folded section 31 is folded double toward the inner side in the vehicle width direction.

The upper end portion 18 and the lower end portion 19 of the airbag 10 may not be folded inside the airbag 10 in response to various conditions. Only one of the upper end portion 18 and the lower end portion 19 may be folded inside the airbag 10. The conditions regarding folding of the airbag 10 includes, for example, the size of the airbag 10, the shape of the airbag 10, the folded shape of the airbag 10, and the deployment condition of the airbag 10. The upper end portion 18 and the lower end portion 19 of the airbag 10 may be folded by other ways of folding in accordance with the various conditions. For example, one or both of the upper end portion 18 and the lower end portion 19 may be folded back to the inner side or the outer side in the vehicle width direction. One or both of the upper end portion 18 and the lower end portion 19 may also be folded in the vehicle top-bottom direction.

Next, there will be described the side airbag device 1 according to other embodiments.

In the side airbag device 1 described below, only the way of folding of the airbag 10 is different from the above-described way of folding. Accordingly, only a folding procedure of the airbag 10 will be described. The upper end portion 18 and the lower end portion 19 of the airbag 10 are folded inside the airbag 10 by procedures shown in FIGS. 3A to 3C and FIGS. 4A to 4C. Subsequently, the airbag 10 is folded so as to be able to deploy in the deployment direction F by roll-like folding, or by roll-like folding and bellows-like folding. First, there will be described the airbag 10 folded by roll-like folding.

Figure 7A:
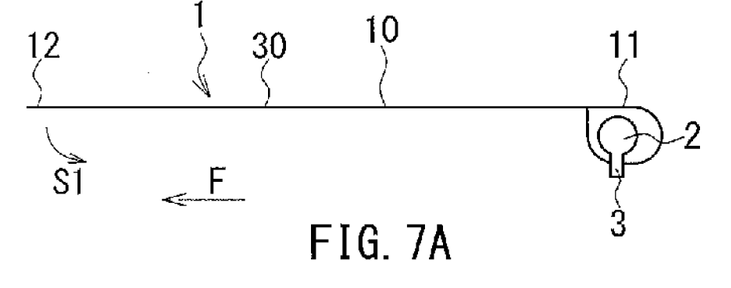
FIGS. 7A to 7D are views showing a folding procedure of the airbag according to another embodiment.
Figure 7B:
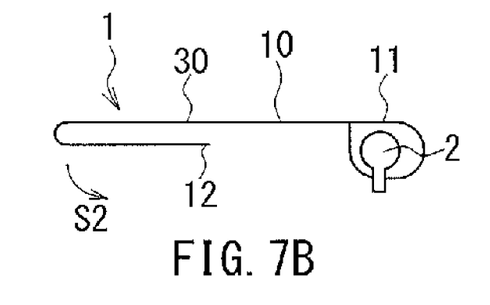
Figure 7C:
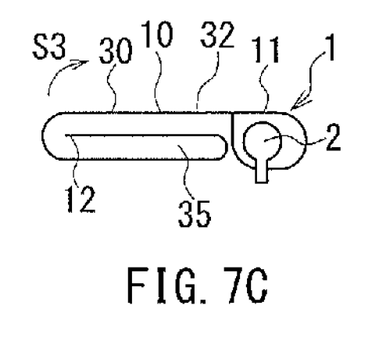
Figure 7D:
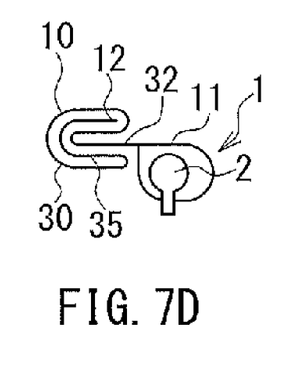

FIGS. 7A to 7D are views showing a procedure of folding the airbag 10 by roll-like folding. FIGS. 7A to 7D are cross-sectional views of the side airbag device 1 corresponding to FIG. 5A to FIG. 5E. The side airbag device 1 is shown in cut-away views along a line in the front/rear direction. The cross-sectional view shown in FIG. 7A is a cross-sectional view of the side airbag device 1 in the same state as FIG. 5A.

The part 30 between the leading end portion 12 and the attaching portion 11 of the airbag 10 is folded in a roll-like shape by roll-like folding. The airbag 10 is wound to the back of the deployment direction F with a predetermined width (see FIG. 7A to FIG. 7C). In this way, the airbag 10 is folded in a roll-like shape by folding it so as to form a roll-like shape. The airbag 10 is folded in a roll-like shape from the leading end portion 12 toward the attaching portion 11 on one surface side of the airbag 10. Here, the airbag 10 is folded in a roll-like shape on the inner side in the vehicle width direction. The airbag 10 is folded back a number of times toward the back of the deployment direction F with a predetermined width (an arrow S1 in FIG. 7A and an arrow S2 in FIG. 7B). A roll-like folded section 35 is formed in the airbag 10 by folding back the airbag 10 twice in the same direction.

The airbag 10 has a roll-like folded section 35 in which the part 30 between the leading end portion 12 and the attaching portion 11 is folded in a roll-like shape by folding it back along a plurality of fold lines. The roll-like folded section 35 is disposed adjacent to the attaching portion 11. The folded-back airbag 10 forms an overlap in the roll-like folded section 35. The roll-like folded section 35 is disposed in front of the attaching portion 11 in the deployment direction F.

Subsequently, the roll-like folded section 35 is folded in a direction opposite to the direction of the roll-like folding by folding it in half toward the outer side in the vehicle width direction (an arrow S3 in FIG. 7C) in the same way as the bellows-like folded section 31. That is, the roll-like folded section 35 is folded in half toward the other surface of the airbag 10 after being folded in a roll-like shape on one surface side of the airbag 10. The roll-like folded section 35 is folded double toward the back of the deployment direction F so that a portion 32 close to the attaching portion 11 is positioned therein (see FIG. 7D). The portion 32 close to the attaching portion 11 is an end portion of the roll-like folded section 35 continuous with the attaching portion 11. This portion 32 is sandwiched in the double-folded roll-like folded section 35. The folded roll-like folded section 35 is disposed in front of the attaching portion 11 in the deployment direction F, and after that, tapes 5 are wound around a plurality of areas in the airbag 10 (see FIG. 5F).

When the airbag 10 is deployed, the gas is initially supplied to the interior portion 32 of the double-folded roll-like folded section 35. The roll-like folded section 35 deploys in such a manner that it is pushed out by the gas in the deployment direction F, and projects toward the deployment direction F. Here, as a result of double folding of the roll-like folded section 35, as in the case of the double-folded bellows-like folded section 31, the direction in which the roll-like folded section 35 deploys is regulated, and thus variation in the deployment direction F is suppressed. The roll-like folded section 35 is stably deployed by the gas at a fast speed in the predetermined deployment direction F. During the early stage of deployment of the airbag 10, the double-folded roll-like folded section 35 accurately deploys toward the lateral space 92 while unfolding, and the double-folded roll-like folded section 35 promptly projects in the deployment direction F.

After being unfolded from the double-folded condition, the roll-like folded section 35 deploys from the attaching portion 11 toward the leading end portion 12, and since the airbag 10 has been folded in a roll-like shape on the inner side in the vehicle width direction, the roll-like folded section 35 deploys toward the inner side of the vehicle. The roll-like folded section 35 deploys to the inner side of the vehicle while deploying toward the deployment direction F. As a result, the roll-like folded section 35 deploys along the sidewall 91 without hitting against the sidewall 91. Since the direction in which the roll-like folded section 35 deploys is stabilized, the roll-like folded section 35 accurately deploys into the lateral space 92. The airbag 10 deploys in the vehicle top-bottom direction while being unfolded from the roll-like folded condition.

When the airbag 10 is folded in a roll-like shape, it is possible to accurately and quickly deploy the airbag 10 toward the lateral space 92. It is also possible to suppress the contact of the airbag 10 with the passenger 90 or the sidewall 91. Furthermore, it is possible to reliably inflate and deploy the airbag 10 to the lateral space 92. It is possible to control the direction in which the roll-like folded section 35 deploys by the direction of roll-like folding. Since the roll-like folded section 35 is finally folded double, the width of the roll-like folded section 35 before being folded double is increased. As a result, the number of times airbag 10 is folded back is reduced. Deployment of the roll-like folded section 35 is sped up since the roll-like folded section 35 is unfolded from the roll-like folded condition, with a reduced number of times.

Meanwhile, when forming the roll-like folded section 35, the airbag 10 may be folded in a roll-like shape by ways of folding other than that described above. That is, the airbag 10 just has to be folded in a roll-like shape so as to be able to deploy in the deployment direction F. The roll-like folded section 35 may also be formed by folding back the airbag 10 three times or more. The airbag 10 may also be folded in a roll-like shape on the outer side in the vehicle width direction. In this case, the roll-like folded section 35 is folded double toward the inner side in the vehicle width direction.

Next, there will be described the airbag 10 folded by roll-like folding and bellows-like folding.

FIGS. 8A to 8E are views showing a folding procedure of the airbag 10 by roll-like folding and bellows-like folding, and are cross-sectional views of the side airbag device 1 similar to FIGS. 7A to 7D.

The part 30 between the leading end portion 12 and the attaching portion 11 of the airbag 10 is folded by roll-like folding and bellows-like folding. First, the airbag 10 is folded in a roll-like shape, with a predetermined width, toward the back of the deployment direction F (see FIG. 8A to FIG. 8C). The airbag 10 is folded in a roll-like shape from the leading end portion 12 toward the attaching portion 11 on one surface side of the airbag 10. Here, the airbag 10 is folded in a roll-like shape on the inner side in the vehicle width direction. The airbag 10 is folded back a number of times, with a predetermined width, toward the back of the deployment direction F (an arrow T1 in FIG. 8A and an arrow T2 in FIG. 8B). A roll-like folded section 37 is formed in the airbag 10 on the leading end portion 12 side by folding back a part 36 of the airbag 10 on the leading end portion 12 side twice in the same direction.

Subsequently, a part 38 of the airbag 10 on the attaching portion 11 side is folded in a bellows-like shape by folding it back once or more. At this time, the roll-like folded section 37 is folded back toward the outer side in the vehicle width direction (an arrow T3 in FIG. 8C), and thus a bellows-like folded section 39 is formed in the airbag 10 on the attaching portion 11 side (see FIG. 8D). The bellows-like folded section 39 is formed so as to have the same width as the roll-like folded section 37, and overlaps with the roll-like folded section 37 on the inner side of the roll-like folded section 37 in the vehicle width direction.

The airbag 10 has a roll-like folded section 37 in which the part 36 on the leading end portion 12 side is folded in a roll-like shape, and a bellows-like folded section 39 in which the part 38 on the attaching portion 11 side is folded in a bellows-like shape. The roll-like folded section 37 and the bellows-like folded section 39 are disposed adjacent to the attaching portion 11, and disposed in front of the attaching portion 11 in the deployment direction F. Next, the roll-like folded section 37 and the bellows-like folded section 39 are folded in a direction opposite to the direction of the bellows-like folding by folding it in half toward the inner side in the vehicle width direction (an arrow T4 in FIG. 8D).

Figure 8A:
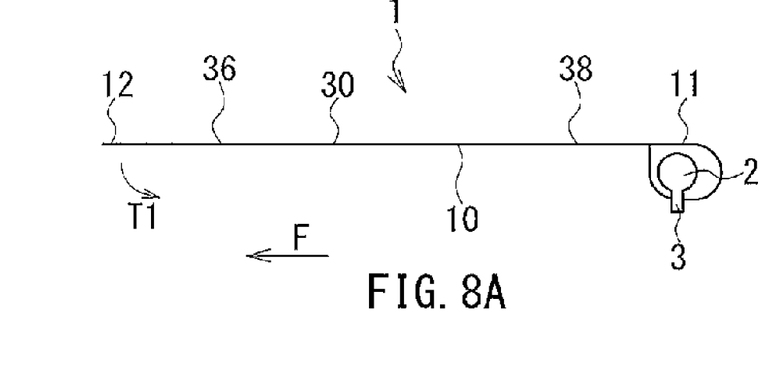
FIGS. 8A to 8E are views showing a folding procedure of the airbag according to another embodiment.
Figure 8B:
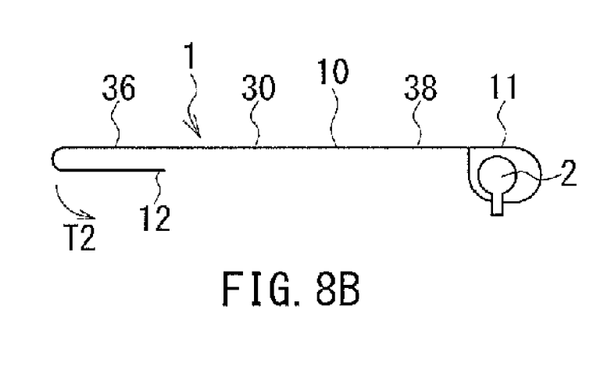
Figure 8C:
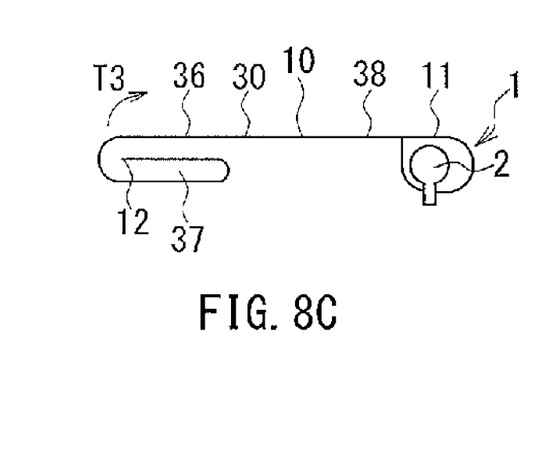
Figure 8D:
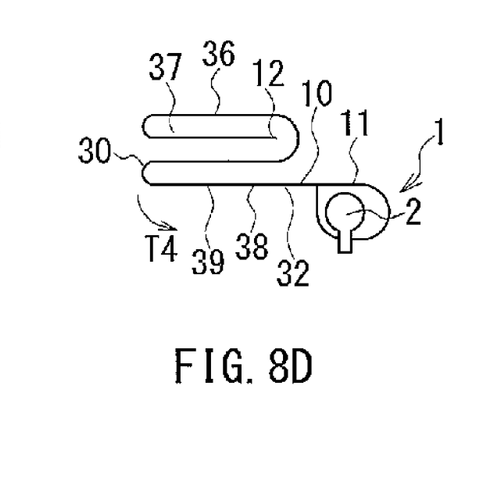
Figure 8E:
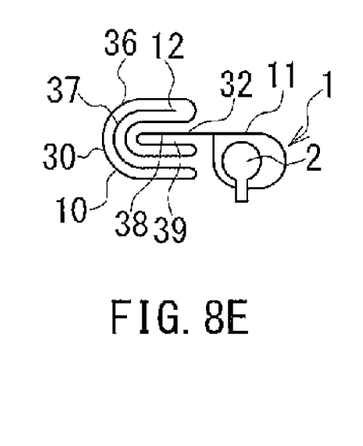

The roll-like folded section 37 and the bellows-like folded section 39 are folded double toward the back of the deployment direction F so that a portion 32 close to the attaching portion 11 is positioned inside (see FIG. 8E). The portion 32 close to the attaching portion 11 is an end portion of the bellows-like folded section 39 continuous with the attaching portion 11. The double-folded bellows-like folded section 39 is sandwiched in the double-folded roll-like folded section 37. The folded roll-like folded section 37 and bellows-like folded section 39 are disposed in front of the attaching portion 11 in the deployment direction F. The bellows-like folded section 39 is disposed in the roll-like folded section 37 in a sandwiched manner, and after that, tapes 5 are wound around a plurality of areas in the airbag 10 (see FIG. 5F).

When the airbag 10 is deployed, the bellows-like folded section 39 starts to be inflated by the gas initially supplied to the interior portion 32 of the double-folded bellows-like folded section 39. The roll-like folded section 37 and the bellows-like folded section 39 deploy in such a manner that they are pushed out by the gas in the deployment direction F, and project toward the deployment direction F. Here, the roll-like folded section 37 and the bellows-like folded section 39 are folded double. As a result, the direction in which the roll-like folded section 37 and the bellows-like folded section 39 deploy is regulated, and thus variation in the deployment direction F is suppressed. The roll-like folded section 37 and the bellows-like folded section 39 are stably deployed by the gas at a fast speed in the predetermined deployment direction F.

During the early stage of deployment of the airbag 10, the double-folded roll-like folded section 37 and bellows-like folded section 39 accurately deploy toward the lateral space 92 while unfolding. The bellows-like folded section 39 deploys at a fast speed, and the roll-like folded section 37 promptly projects in the deployment direction F, by being pushed by the bellows-like folded section 39. When being unfolded from the double-folded condition, the bellows-like folded section 39 rapidly deploys toward the lateral space 92, and subsequently, the roll-like folded section 37 deploys toward the leading end portion 12. Since the airbag 10 has been folded in a roll-like shape on the inner side in the vehicle width direction, the roll-like folded section 37, as in the case of the roll-like folded section 35 described above, deploys toward the inner side of the vehicle, to thereby deploy to the inner side of the vehicle while deploying toward the deployment direction F. The roll-like folded section 37 accurately deploys into the lateral space 92.

By deploying as described above, the bellows-like folded section 39 and the roll-like folded section 37 accurately and quickly deploy to the lateral space 92. The airbag 10 deploys in the vehicle top-bottom direction while being unfolded from the bellows-like folded and roll-like folded condition.

When the airbag 10 is folded by bellows-like folding and roll-like folding, it is possible to accurately and quickly deploy the airbag 10 toward the lateral space 92. It is also possible to suppress contact of the airbag 10 with the passenger 90 or the sidewall 91. Furthermore, it is possible to reliably inflate and deploy the airbag 10 to the lateral space 92. It is possible to speed up deployment of the airbag 10 by bellows-like folding. It is also possible to control the direction in which the roll-like folded section 37 deploys by the direction of roll-like folding. It is possible to reliably regulate the deployment direction of the bellows-like folded section 39 by sandwiching the bellows-like folded section 39 in the roll-like folded section 37.

Meanwhile, when forming the roll-like folded section 37 and the bellows-like folded section 39, the airbag 10 may be folded by ways of folding other than that described above. That is, the airbag 10 just has to be folded so as to be able to deploy in the deployment direction F by roll-like folding and bellows-like folding. The roll-like folded section 37 may also be formed by folding back the airbag 10 three times or more. The bellows-like folded section 39 may also be formed by folding back the airbag 10 twice or more. The airbag 10 may also be folded in a roll-like shape on the outer side in the vehicle width direction. In this case, the bellows-like folded section 39 is formed on the outer side of the roll-like folded section 37 in the vehicle width direction. Furthermore, the roll-like folded section 37 and the bellows-like folded section 39 are folded double toward the outer side in the vehicle width direction.

REFERENCE SIGNS LIST 1 side airbag device
2 inflator
3 attaching member
4 harness
5 tape
10 airbag
11 attaching portion
12 leading end portion
13 vent hole
14 front base cloth
15 back base cloth
16 outer edge joint portion
17 air chamber
18 upper end portion
19 lower end portion
20 slit
21-29 fold line
30 part
31 bellows-like folded section
32 portion
35 roll-like folded section
37 roll-like folded section
39 bellows-like folded section
80 seat
81 seat cushion
82 seat back
83 headrest
84 housing portion
85 side section
90 passenger
91 sidewall
92 lateral space

The invention claimed is:

1. A side airbag device mounted on a side section of a seat for a vehicle to protect a passenger in a lateral space between the passenger sitting on the seat and a sidewall of the vehicle, comprising:
    an airbag configured by a front base cloth and a back base cloth which are overlapped and joined with Outer edges thereof, and having an attaching portion attached to the side section of the seat, and being folded up so as to be able to deploy from the side section of the seat toward the lateral space; and
    an inflator which generates gas for inflating and deploying the airbag from the attaching portion to a leading end portion thereof in a deployment direction,
    wherein the overlapped front base cloth and back base cloth of the airbag together form a bellows-like folded section in which a part between the leading end portion and the attaching portion is folded in a bellows-like shape; and
    wherein the bellows-like folded section is disposed adjacent to the attaching portion and in a deployment direction side, and the bellows-like folded section is folded double toward a back of the deployment direction so that a portion of the airbag close to the attaching portion is positioned therein.

2. The side airbag device according to claim 1, wherein the bellows-like folded section is folded back in a bellows-like shape along fold lines intersecting with the deployment direction and then folded in half.

3. The side airbag device according to claim 2, wherein an upper end portion or a lower end portion of the airbag is folded inside the airbag.

4. The side airbag device according to claim 1, wherein an upper end portion or a lower end portion of the airbag is folded inside the airbag.

5. A side airbag device mounted on a side section of a seat for a vehicle to protect a passenger in a lateral space between the passenger sitting on the seat and a sidewall of the vehicle, comprising:
- an airbag configured by a front base cloth and a back base cloth which are overlapped and joined with outer edges thereof, and having an attaching portion attached to the side section of the seat, and being folded up so as to be able to deploy from the side section of the seat toward the lateral space; and
- an inflator which generates gas for inflating and deploying the airbag from the attaching portion to a leading end portion thereof in a deployment direction,
- wherein the overlapped front base cloth and back base cloth of the airbag together form a roll-like folded section in which a part between the leading end portion and the attaching portion is folded in a roll-like shape; and
- wherein the roll-like folded section is disposed adjacent to the attaching portion and in a deployment direction side, and the roll-like folded section is folded double toward a back of the deployment direction so that a portion of the airbag close to the attaching portion is positioned therein.

6. The side airbag device according to claim 5,
- wherein the airbag is folded in a roll-like shape from the leading end portion toward the attaching portion on one surface side of the airbag; and
- wherein the roll-like folded section is folded in half toward the other surface side of the airbag.

7. The side airbag device according to claim 6, wherein
- an upper end portion or a lower end portion of the airbag is folded inside the airbag.

8. The side airbag device according to claim 5, wherein
- an upper end portion or a lower end portion of the airbag is folded inside the airbag.

9. A side airbag device mounted on a side section of a seat for a vehicle to protect a passenger in a lateral space between the passenger sitting on the seat and a sidewall of the vehicle, comprising:
- an airbag configured by a front base cloth and a back base cloth which are overlapped and joined with outer edges thereof, and having an attaching portion attached to the side section of the seat, and being folded up so as to be able to deploy from the side section of the seat toward the lateral space; and
- an inflator which generates gas for inflating and deploying the airbag from the attaching portion to a leading end portion thereof in a deployment direction,
- wherein the overlapped front base cloth and back base cloth of the airbag together form a roll-like folded section in which a part on the leading end portion is folded in a roll-like shape, and a bellows-like folded section in which a part on the attaching portion is folded in a bellows-like shape; and
- wherein the roll-like folded section and the bellows-like folded section are disposed adjacent to the attaching portion and in a deployment direction side, and the roll-like folded section and the bellows-like folded section are folded double toward a back of the deployment direction so that a portion of the airbag close to the attaching portion is positioned therein.

10. The side airbag device according to claim 9, wherein the double-folded bellows-like folded section is sandwiched in the double-folded roll-like folded section.

11. The side airbag device according to claim 10, wherein
- an upper end portion or a lower end portion of the airbag is folded inside the airbag.

12. The side airbag device according to claim 9, wherein
- an upper end portion or a lower end portion of the airbag is folded inside the airbag.

* * * * *